UNITED STATES PATENT OFFICE.

WILLIAM MERRITT GILLAM, OF LONDON, ENGLAND.

PROCESS OF PREPARING FUEL.

SPECIFICATION forming part of Letters Patent No. 658,635, dated September 25, 1900.

Application filed January 2, 1900. Serial No. 189. (No specimens.)

*To all whom it may concern:*

Be it known that I, WILLIAM MERRITT GILLAM, a subject of the Queen of Great Britain, residing at 5 Whittington avenue, Leadenhall street, London, England, have invented a certain new and Improved Process of Preparing Fuel, of which the following is a full specification.

This invention relates to fuel; and it consists of a process whereby the fuel is enriched, as hereinafter fully described and claimed.

In carrying out this invention a light and porous fuel, such as peat, is first dried in any approved manner to free it from moisture. The fuel is then heated in a closed vessel under pressure until its volatile constituents are driven out of it in the form of gases and the fuel is rendered extremely porous. A hydrocarbon in the form of a spray of oil is then injected into the said vessel so that it mixes with the gaseous constituents of the fuel. A mineral oil is preferred, and it is added after the heating step and when the cooling commences. When the fuel cools, it absorbs the hydrocarbon and its gaseous constituents as well, and thereby becomes greatly enriched.

By driving out the gaseous constituents from the fuel before adding the hydrocarbon the fuel is reduced to a very porous condition by a moderate degree of heat, as the said gaseous or volatile constituents are driven out against a moderate resistance. The porous fuel has then a much greater capacity for absorption than it would have had if the hydrocarbon had been added to it in the first place. When the hydrocarbon is added first, it forms a dense gaseous envelop which forms a resistance to the escape of the volatile constituents from the fuel, and this resistance can only partially be overcome by increasing the heat, because the increase of heat increases the pressure of the dense gaseous envelop, and therefore increases the resistance. Portions of the volatile constituents are reabsorbed by the cooling-fuel with the hydrocarbon, the fuel being enriched both by being fortified by the hydrocarbon and by getting rid of constituents which do not aid in producing heat and having their places taken by the hydrocarbon.

I declare that what I claim is—

A process for enriching fuel, which consists in first heating the fuel under pressure to drive out its gaseous constituents without permitting them to escape into the atmosphere, then adding a hydrocarbon in a finely-divided condition to the said gaseous constituents under the said pressure, and finally permitting the fuel to cool under the said pressure, whereby the said hydrocarbon and gaseous constituents as well are absorbed by the fuel, substantially as set forth.

In witness whereof I have signed this specification in the presence of two witnesses.

WM. MERRITT GILLAM.

Witnesses:
   A. E. MELHUISH,
   B. ROSENBERG.